(12) United States Patent
Purpura et al.

(10) Patent No.: US 9,336,494 B1
(45) Date of Patent: May 10, 2016

(54) RE-TRAINING A MACHINE LEARNING MODEL

(71) Applicant: Context Relevant, Inc., Seattle, WA (US)

(72) Inventors: Stephen Purpura, Seattle, WA (US); James E. Walsh, Woodinville, WA (US); Dustin Lundring Rigg Hillard, Seattle, WA (US)

(73) Assignee: Context Relevant, Inc., Seattle, WA (US)

( * ) Notice: Subject to any disclaimer, the term of this patent is extended or adjusted under 35 U.S.C. 154(b) by 327 days.

(21) Appl. No.: 13/969,193

(22) Filed: Aug. 16, 2013

Related U.S. Application Data

(60) Provisional application No. 61/691,260, filed on Aug. 20, 2012.

(51) Int. Cl.
*G06N 99/00* (2010.01)

(52) U.S. Cl.
CPC .................................. *G06N 99/005* (2013.01)

(58) Field of Classification Search
CPC .................................................... G06N 99/005
USPC ............................................................ 706/12
See application file for complete search history.

(56) References Cited

U.S. PATENT DOCUMENTS

| | | | | |
|---|---|---|---|---|
| 7,480,640 | B1* | 1/2009 | Elad et al. | 706/14 |
| 7,499,897 | B2* | 3/2009 | Pinto et al. | 706/46 |
| 7,788,195 | B1* | 8/2010 | Subramanian et al. | 706/20 |
| 7,848,909 | B2* | 12/2010 | Kraiss | 703/6 |
| 7,933,762 | B2* | 4/2011 | Pinto et al. | 703/22 |
| 8,250,009 | B1* | 8/2012 | Breckenridge et al. | 706/14 |
| 8,438,122 | B1* | 5/2013 | Mann et al. | 706/12 |
| 8,521,663 | B1* | 8/2013 | Phillips et al. | 706/12 |
| 2007/0050305 | A1* | 3/2007 | Klein | 705/67 |
| 2007/0244741 | A1* | 10/2007 | Blume et al. | 705/10 |
| 2009/0192957 | A1* | 7/2009 | Subramanian et al. | 706/21 |
| 2009/0234683 | A1* | 9/2009 | Anderson et al. | 705/7 |
| 2010/0145836 | A1* | 6/2010 | Baker et al. | 705/30 |
| 2010/0250370 | A1* | 9/2010 | Jones et al. | 705/14.66 |
| 2012/0191630 | A1* | 7/2012 | Breckenridge et al. | 706/12 |
| 2012/0191631 | A1* | 7/2012 | Breckenridge et al. | 706/12 |
| 2012/0284213 | A1* | 11/2012 | Lin et al. | 706/12 |
| 2013/0006668 | A1* | 1/2013 | Van Arkel et al. | 705/3 |

OTHER PUBLICATIONS

Staelin C., "Parameter selection for support vector machines", HP Laboratories Israel1, HPL-2002-354 (R.1), Nov. 10, 2003.*
Hsieh N. et al., "A data driven ensemble classifier for credit scoring analysis", Expert Systems with Applications, 37, 2010, pp. 534-545.*
Liu D. et al., "On the Limited Memory BFGS Method for Large Scale Optimization", Mathematical Programming, 45, 1989, pp. 503-528.*
Friedman J. et al., "Predictive Learning Via Rule Ensembles", The Annals of Applied Statistics, 2008, vol. 2, No. 3, pp. 916-954.*

\* cited by examiner

*Primary Examiner* — Stanley K Hill
*Assistant Examiner* — Dave Misir
(74) *Attorney, Agent, or Firm* — Fish & Richardson P.C.

(57) ABSTRACT

Methods, systems, and apparatus, including computer programs encoded on computer storage media, for training machine learning models. The models can include models for predicting a next transaction price or a next transaction price direction for one or more financial products, for classifying particular debit or credit card transactions as likely being anomalous or fraudulent or not, or for classifying particular financial claims processing transactions, e.g., insurance, health care, or employee expense claims transactions, as likely being anomalous or fraudulent or not.

22 Claims, 2 Drawing Sheets

RE-TRAINING A MACHINE LEARNING MODEL

CROSS REFERENCE TO RELATED APPLICATIONS

This application is a non-provisional of and claims priority to U.S. Provisional Patent Application No. 61/691,260, filed on Aug. 20, 2012, the entire contents of which are hereby incorporated by reference.

BACKGROUND

This specification relates to training machine learning models.

A machine learning model training system can train a machine learning model by iteratively determining values of the parameters of the model by finding a minimum or a maximum of a cost function of parameters of the model.

SUMMARY

This specification relates to re-training machine learning models.

Particular embodiments of the subject matter described in this specification can be implemented so as to realize one or more of the following advantages. The amount of time required to re-train a previously trained predictive model, e.g., when a change in the input data has caused the model to perform unsatisfactorily, can be greatly reduced. The number of feature vectors that are processed to re-train the model can be greatly reduced.

A predictive model trained as described in this specification may be used to predict a number of different types of outputs, depending on what the input features and vectors represent.

For example, the predictive model could be used to generate financial product trade price or direction predictions, i.e. predicting the next trade price of particular financial product, or whether the next trade of a particular product likely to be at a higher price, or at a lower price, than the most recent trade.

As another example, the predictive model could be used to generate fraud or anomaly predictions for credit card transactions, or for debit card transactions, i.e. predicting the likelihood that a particular transaction is fraudulent or otherwise anomalous.

As another example, the predictive model could be used to generate fraud or anomaly predictions for claims data for any type of financial claims processing, i.e. predicting the likelihood that a particular insurance claim, or health care claim, or employee expense claim, is fraudulent or otherwise anomalous and worthy of further inspection.

As another example, the predictive model could be used to generate expected values for financial transaction data for any type of purchase decision making, i.e. predicting what the expected value would be for a health care claim for a particular procedure in a certain city, or the expected price of airfare between two cities on a particular date, or the expected price of a hotel room in a particular city on a particular date. These expected values could then further be used in fraud or anomaly detection or prediction, i.e. if a financial transaction or claim was for an amount sufficient different than the predicted value, it may potentially be considered fraudulent or anomalous.

As another example, the predictive model could be used to generate likelihoods of user activities in an interactive computer based system. For example, predicting the likelihood that a user would click on a particular button on a web page, or purchase a particular product, or click on a particular advertisement or advertising link.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
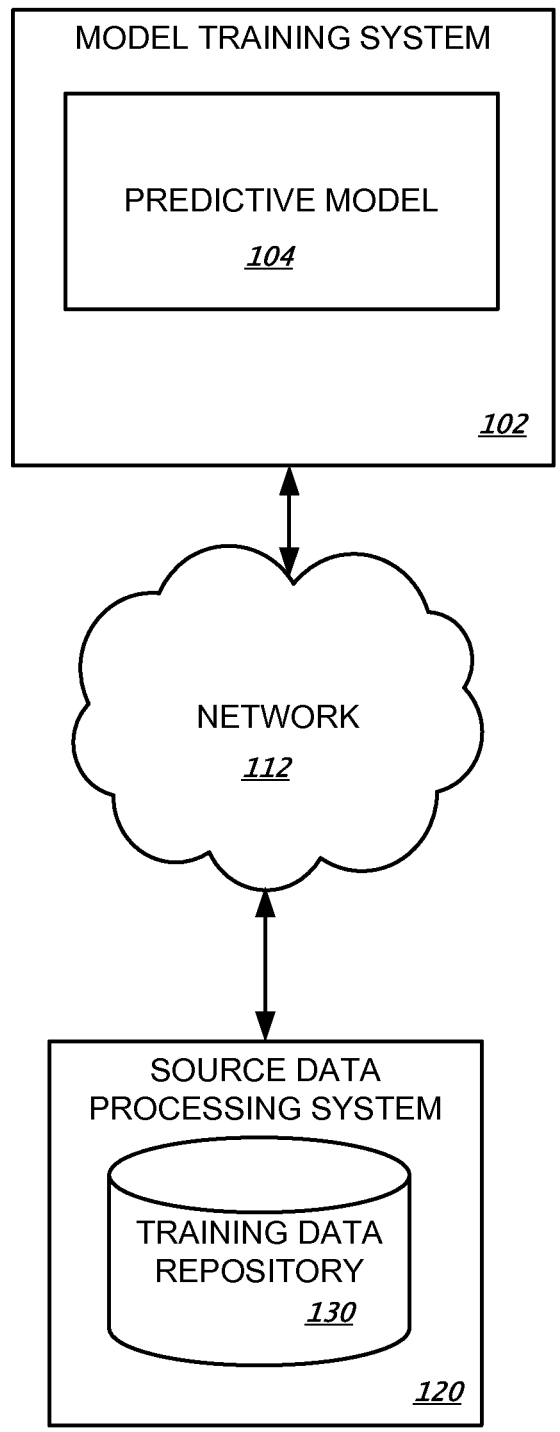
FIG. 1 shows an example machine learning model training system.

FIG. 1 shows an example machine learning model training system 102. The model training system 102 is an example of a system implemented as one or more computer programs on one or more computers in one or more locations, in which the systems, components, and techniques described below can be implemented.

The model training system 102 is coupled to a source data processing system 120 through a data communication network 112, e.g., local area network (LAN) or wide area network (WAN), e.g., the Internet, or a combination of networks, any of which may include wireless links. The model training system 102 receives data from the source data processing system 120 over the network 112 and uses the data to train a predictive model 104. In some implementations, the model training system 102 and the source data processing system 120 are implemented on one or more common computers.

The predictive model 104 is a machine learning model that receives an input and predicts an outcome based on the received input and on values of the parameters of the model. The predictive model 104 is trained using training data from a training data repository 130. The training data in the training data repository 130 are training examples for which the desired outcome, i.e., the outcome that should be predicted by the model, is known or has been estimated. Each example provided to a model—whether for training or, later, for evaluation—will be referred to as a "feature vector," in accordance with convention, although the data can actually be arranged, transmitted, and used in any convenient form. Similarly, each data item in a feature vector will be referred to as a "feature," which has a value.

By training a model, the model training system 102 generates values of the model parameters by minimizing or maximizing a cost function that is a measure of the performance of the model on the training data as a function of the model parameters. The trained parameter values may for convenience be referred to as "optimal" values, with the understanding that this usage does not imply that the values are optimal in any absolute sense.

In some implementations, each feature in the feature vector provided for the model includes the data in a corresponding field of a corresponding raw data instance, e.g., data record, of the raw training data stored in training data repository 130. Generally, however, in accordance with conventional practice, the feature vector will be transformed, e.g., the feature values may be standardized or normalized. Optionally, the amount of data can be reduced by using lossy compression, e.g., by a global or feature-specific binning or by using a bitmask data structure. In addition to the feature values derived directly from a single training data value, the features can optionally include values derived from two or more original data values, e.g., by including features with values that are polynomials of normalized feature values up to a small degree, e.g., one or two, values that are a product of two or more feature values, or both. When describing the process from the point of view of a model, each of these is simply a feature vector. However, where the distinction may be important, feature vectors that result from processing that reduces granularity of any feature value or that reduces the number of fields of raw data that are represented may be referred to as "reduced" feature vectors. The processing of the data to generate the final form of the feature vectors, which may or may not be reduced, can be performed on the source data processing system 120 in order to reduce the amount of data transmitted to the model training system 102.

The model training system 102 trains the predictive model 104 using a machine learning model training process. For example, the model training process may be a conjugate gradient procedure, a gradient descent procedure, a neural network training process, a support vector machine training process, a decision tree training process, or another conventional model training process. In some implementations, the model training process is a gradient descent training procedure that uses a limited-memory Broyden-Fletcher-Goldfarb-Shanno (L-BFGS) process to optimize the cost function of the model. One L-BFGS process that may be used by the model training system 102 to train the predictive model 104 is described in U.S. Patent Application No. 61/691,256, titled "Training a Machine Learning Model" and filed on Aug. 20, 2012, the disclosure of which is hereby incorporated by reference in its entirety.

Once the predictive model 104 has been trained, the source data processing system 120 may provide a sequence of feature vectors for which the desired outcome is not known to the predictive model 104 for evaluation. The trained predictive model 104 can predict an outcome for feature vectors in the sequence and compare the observed outcome for each feature vector to the predicted outcome to determine whether to re-train the predictive model 104. For example, the source data processing system 120 may be part of a system that uses predictions to decide how to respond to events in real time. The feature vectors can represent the events, the predictions can be predictions about how another entity will behave, e.g., how a market will price an asset, e.g., a company stock or a commodity, and the observed outcomes can be data representing how the other entity actually behaved, e.g., how the market did price the asset after the events. In some cases, the feature vectors in the sequence may include one or more reserved feature vectors. A reserved feature vector is a feature vector for which the output that should be provided by the system is known but is not provided to the predictive model 104, i.e., the outcome for a reserved feature vector does not need to be observed after the prediction is generated. In some other cases, the feature vectors in the sequence may include data from an A/B test, with some feature vectors in the sequence being live vectors for which the outcome is observed after the prediction is generated and with other feature vectors in the sequence having a known outcome or an outcome predicted by a different predictive model.

A method for processing a sequence of feature vectors used by a trained model is described below with reference to FIG. 2.

Figure 2:
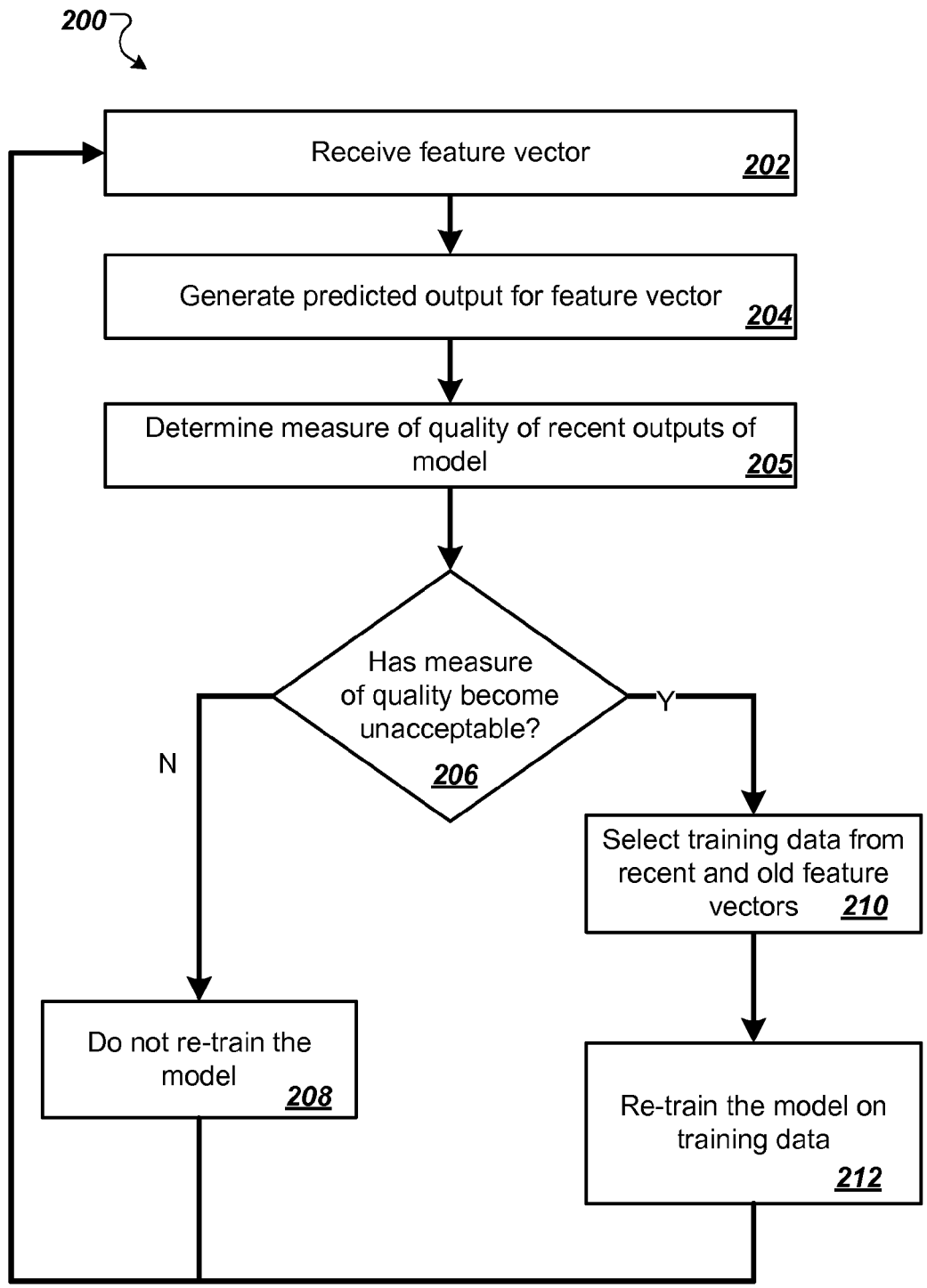
FIG. 2 is a flow diagram of an example process for processing a feature vector.

FIG. 2 is a flow diagram of an example process 200 for processing a feature vector. For convenience, the process 200 will be described as being performed by a system of one or more computers located in one or more locations. For example, a model training system, e.g., the model training system 102 of FIG. 1, appropriately programmed in accordance with this specification, can perform the process 200.

The process 200 can be performed for each feature vector in a temporal sequence of feature vectors received by a model training system. For example, the sequence of feature vectors can be provided to the system by a source data processing system, e.g., the source data processing system 120, in order for the system to evaluate the feature vectors, i.e., use a predictive model to predict outcomes for the vectors in the sequence.

The system receives a feature vector (step 202).

The system generates a predicted outcome for the feature vector using the predictive model (step 204). The predictive model has previously been trained on a set of training data to generate current parameter values for the model parameters. That is, the predictive model was trained to predict outcomes for the training data with an acceptable quality.

The system determines a measure of quality of recent outputs of the model (step 205). That is, the system compares the predicted outcome for each feature vector in a window of recently received feature vectors in the sequence to the actual, i.e., observed or known, outcomes for the feature vectors in the window. The window can include, e.g., a specified number of recently received feature vectors or each feature vector received during a most-recent time window of a specified size. From the comparison, the system can determine a new value of the measure of quality of the model when applied to the feature vectors in the window.

For example, the measure of the quality of the model may be a regret function r(X), for example, a function which can be expressed as:

$$r(X) = \sum_{(z,y) \in X} \frac{err(f(z), y)}{|X|}$$

where X is a set of data that consists of (z, y) ordered pairs and on which the quality is being measured, with each z being a feature vector and y being the corresponding known outcome for the feature vector, where f(z) is the predicted outcome for the feature vector z, where err(f(z), y) is an appropriate error measure for the model, and where |X| is the number of ordered pairs in X.

The system determines whether, as of the feature vector, a measure of the quality of the output of the model has become unacceptable (step 206). In order to determine whether the measure of the quality has become unacceptable, the system compares the new value of the measure of quality of the output of the model when applied to the feature vectors in the window to the value of the measure of quality of the output of the model when applied to old feature vectors previously received by the system to determine if the new value is acceptable. An old feature vector is a feature vector that was received by the system prior to the beginning of the window. The system can then determine that the measure of the quality of the model is acceptable only if:

$$r(X_{[t,t+1]}) \leq r(X_{[t-n,t]}) + \sigma(t)$$

where $r(X_{[t,t+1]})$ is the new value of the regret function for the feature vectors in the window, $r(X_{[t-n,t]})$ is the value of the regret function for one or more sets of old feature vectors, and $\sigma(t)$ is a specified parameter giving the acceptable variance for the measure of quality. For example, the value of $\sigma(t)$ can be determined from the variance between the values of the regret functions for one or more previous sets of feature vectors.

In some implementations, the system determines the measure of quality of recent outputs and makes the determination of whether the output quality is acceptable on a periodic basis, rather than making the determination with each received feature vector. For example, the period can be based on a number of vectors, e.g., every 5000 vectors, or an amount of time, e.g., every 0.25 seconds.

If the measure of the quality of the output of the model when applied to the feature vectors in the window is acceptable, the system does not re-train the model (step 208).

If the measure of the quality of the output model has become unacceptable, the system selects training data that includes recent feature vectors and old feature vectors for use in re-training the model (step 210). The system selects the training data by making a first selection from among recent feature vectors, i.e., feature vectors in the window, and a second selection from old feature vectors, i.e., feature vectors processed by the system before the beginning of the window. In particular, the system selects feature vectors from $X_{[t,t+1]}$ and from $X_{[t-n,t]}$, with vectors from $X_{[t,t+1]}$ being overrepresented in the selection. That is, the ratio of recent feature vectors to old feature vectors in the feature vectors that are used to re-train the model is greater than the ratio of the total number of recent vectors to the total number of old feature vectors. The degree to which recent vectors are overrepresented can be based on the value of $r(X_{[t,t+1]})$, i.e., so that the higher the value of the regret function for the recent feature vectors, the more recent feature vectors relative to old feature vectors are used to re-train the model.

The system re-trains the model on the training data (step 212). In particular, the system performs iterations of a model training process to generate updated values of the model parameters. Because the model is being re-trained on only a subset of the old feature vectors, the time necessary to re-train the model and the amount of feature vectors that must be processed in order to re-train the model can be greatly reduced when compared to the time required to re-train a model with comparable quality on the entire set of old feature vectors.

In some implementations, prior to re-training the model, the system can determine whether or not to adjust a binning strategy previously used to train the model. A binning strategy is a strategy that determines, for one or more of the features included in feature vectors provided to the model for training, how values of the feature are binned, i.e., divided into bins. Generally, the system may perform one or more training experiments to select a new binning strategy for use in re-training the model. Binning strategies and methods for performing experiments to select a binning strategy for use in training a model are described in U.S. Patent Application No. 61/691,261, titled "Selecting a Training Strategy for Training a Machine Learning Model" and filed on Aug. 20, 2012, the disclosure of which is hereby incorporated by reference in its entirety. The extent to which the system attempts to select a new binning strategy for the re-training may depend in part on time constraints under which the re-training must be performed and on whether sufficient computing resources are available to continue performing the training experiments.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving an ordered sequence of feature vectors;
   for each feature vector of a plurality of feature vectors in the ordered sequence:
      using a predictive model having a plurality of parameters to generate a predicted output for the feature vector, wherein the predictive model has been trained on a plurality of old feature vectors using a model training process that generates respective first parameter values for each of the plurality of parameters of the predictive model,
      identifying recent feature vectors in the ordered sequence, wherein each recent feature vector is within a window of predetermined size preceding the feature vector in the ordered sequence, and
      computing a measure of the quality of the output of the predictive model on the recent feature vectors;
   determining, for a first feature vector, that the quality of the output of the predictive model on first recent feature vectors within a first window of the predetermined size preceding the first feature vector in the ordered sequence has become unacceptable as of the first feature vector, and in response:
   selecting retraining data for retraining the predictive model from a collection of feature vectors consisting of the first recent feature vectors and the plurality of old feature vectors, wherein the ratio of first recent feature vectors to old feature vectors in the retraining data is greater than the corresponding ratio in the collection by an amount based on how unacceptable the quality of the output has become as of the first feature vector, whereby a more unacceptable quality of the output results in the retraining data having a greater ratio of first recent feature vectors to old feature vectors; and
   retraining the predictive model on the retraining data.

2. The method of claim 1, further comprising:
   determining that, as of a second feature vector preceding the first feature vector in the ordered sequence, the measure of the quality of the output of the predictive model remains acceptable; and
   refraining from retraining the predictive model.

3. The method of claim 1, wherein the model training process is a gradient descent process.

4. The method of claim 3, wherein the gradient descent process uses a limited-memory Broyden-Fletcher-Goldfarb-Shanno (L-BFGS) optimization process.

5. The method of claim 1, wherein determining that the measure of the quality of the output of the predictive model has become unacceptable comprises:
   computing a measure of the quality of the output of the predictive model on one or more sets of old feature vectors; and
   determining that the measure of the quality of the output of the predictive model on the first recent feature vectors is unacceptable based on a comparison of the measure of the quality of the output of the predictive model on the first recent feature vectors and the measure of the quality of the output of the predictive model on the one or more sets of old feature vectors.

6. The method of claim 1, wherein:
   the plurality of feature vectors comprises vectors representing completed financial product transactions including transaction prices; and
   the predictive model is a model predicting a next transaction price or a next transaction price direction for one or more financial products.

7. The method of claim 6, wherein the financial products comprise one or more of common stock shares, exchange traded fund shares, options contracts, commodity futures contracts, or financial derivative contracts.

8. The method of claim 6, wherein the predictive model is a model predicting whether a next transaction price for a particular financial product is likely to be at a higher price or at a lower price than a most recent completed transaction.

9. The method of claim 6, wherein the next transaction is a next trade on an electronic exchange.

10. The method of claim 1, wherein:
    the plurality of feature vectors comprises vectors representing completed credit card transactions or debit card transactions or both; and
    the predictive model is a model classifying particular transactions as likely being anomalous or not.

11. The method of claim 1, wherein:
    the plurality of feature vectors comprises vectors representing financial claims processing transactions; and
    the predictive model is a model classifying particular transactions as likely being anomalous or not.

12. The method of claim 1, wherein:
    the plurality of feature vectors comprises vectors representing prices for products or services or both at particular times or places or both; and
    the predictive model is a model predicting prices for products or services or both in particular places or on particular dates or both.

13. The method of claim 1, wherein:
    the plurality of feature vectors comprises vectors representing purchase transactions representing purchases of products or services or both and including respective prices paid for the products or services or both; and
    the predictive model is a model predicting prices for products or services in particular places or on particular dates or both.

14. The method of claim 13, wherein:
    the predictive model is further a model classifying particular prices for particular products or services as likely being anomalous or not.

15. The method of claim 14, wherein:
    the predictive model is further a model classifying particular prices for particular products or services as likely being fraudulent or not.

16. The method of claim 1, wherein:
    the plurality of feature vectors comprises vectors representing user actions on an interactive computer-based system; and
    the predictive model is a model predicting user actions on the interactive computer-based system.

17. A system comprising one or more computers and one or more storage devices storing instructions that are operable, when executed by the one or more computers, to cause the one or more computers to perform operations comprising:
    receiving an ordered sequence of feature vectors;
      for each feature vector of a plurality of feature vectors in the ordered sequence:
        using a predictive model having a plurality of parameters to generate a predicted output for the feature vector, wherein the predictive model has been trained on a plurality of old feature vectors using a model training process that generates respective first parameter values for each of the plurality of parameters of the predictive model,
        identifying recent feature vectors in the ordered sequence, wherein each recent feature vector is within a window of predetermined size preceding the feature vector in the ordered sequence, and
        computing a measure of the quality of the output of the predictive model on the recent feature vectors;
      determining, for a first feature vector, that the quality of the output of the predictive model on first recent feature vectors within a first window of the predetermined size preceding the first feature vector in the ordered sequence has become unacceptable as of the first feature vector, and in response:
        selecting retraining data for retraining the predictive model from a collection of feature vectors consisting of the first recent feature vectors and the plurality of old feature vectors, wherein the ratio of first recent feature vectors to old feature vectors in the retraining data is greater than the corresponding ratio in the collection by an amount based on how unacceptable the quality of the output has become as of the first feature vector, whereby a more unacceptable quality of the output results in the retraining data having a greater ratio of first recent feature vectors to old feature vectors; and
        retraining the predictive model on the retraining data.

18. The system of claim 17, the operations further comprising:
    determining that, as of a second feature vector preceding the first feature vector in the ordered sequence, the measure of the quality of the output of the predictive model remains acceptable; and
    refraining from retraining the predictive model.

19. The system of claim 17, wherein determining that the measure of the quality of the output of the predictive model has become unacceptable comprises:
    computing a measure of the quality of the output of the predictive model on one or more sets of old feature vectors; and
    determining that the measure of the quality of the output of the predictive model on the first recent feature vectors is unacceptable based on a comparison of the measure of the quality of the output of the predictive model on the first recent feature vectors and the measure of the quality of the output of the predictive model on the one or more sets of old feature vectors.

20. A non-transitory computer storage medium encoded with instructions that, when executed by one or more computers, cause the one or more computers to perform operations comprising:

receiving an ordered sequence of feature vectors;

for each feature vector of a plurality of feature vectors in the ordered sequence:

using a predictive model having a plurality of parameters to generate a predicted output for the feature vector, wherein the predictive model has been trained on a plurality of old feature vectors using a model training process that generates respective first parameter values for each of the plurality of parameters of the predictive model, identifying recent feature vectors in the ordered sequence, wherein each recent feature vector is within a window of predetermined size preceding the feature vector in the ordered sequence, and computing a measure of the quality of the output of the predictive model on the recent feature vectors;

determining, for a first feature vector, that the quality of the output of the predictive model on first recent feature vectors within a first window of the predetermined size preceding the first feature vector in the ordered sequence has become unacceptable as of the first feature vector, and in response:

selecting retraining data for retraining the predictive model from a collection of feature vectors consisting of the first recent feature vectors and the plurality of old feature vectors, wherein the ratio of first recent feature vectors to old feature vectors in the retraining data is greater than the corresponding ratio in the collection by an amount based on how unacceptable the quality of the output has become as of the first feature vector, whereby a more unacceptable quality of the output results in the retraining data having a greater ratio of first recent feature vectors to old feature vectors; and retraining the predictive model on the retraining data.

21. The non-transitory computer storage medium of claim 20, the operations further comprising:

determining that, as of a second feature vector preceding the first feature vector in the ordered sequence, the measure of the quality of the output of the predictive model remains acceptable; and refraining from retraining the predictive model.

22. The non-transitory computer storage medium of claim 20, wherein determining that the measure of the quality of the output of the predictive model has become unacceptable comprises:

computing a measure of the quality of the output of the predictive model on one or more sets of old feature vectors; and determining that the measure of the quality of the output of the predictive model on the first recent feature vectors is unacceptable based on a comparison of the measure of the quality of the output of the predictive model on the first recent feature vectors and the measure of the quality of the output of the predictive model on the one or more sets of old feature vectors.

* * * * *